(No Model.)
W. H. KNIGHT.
ELECTRIC RAILWAY TRUCK.
No. 451,491. Patented May 5, 1891.
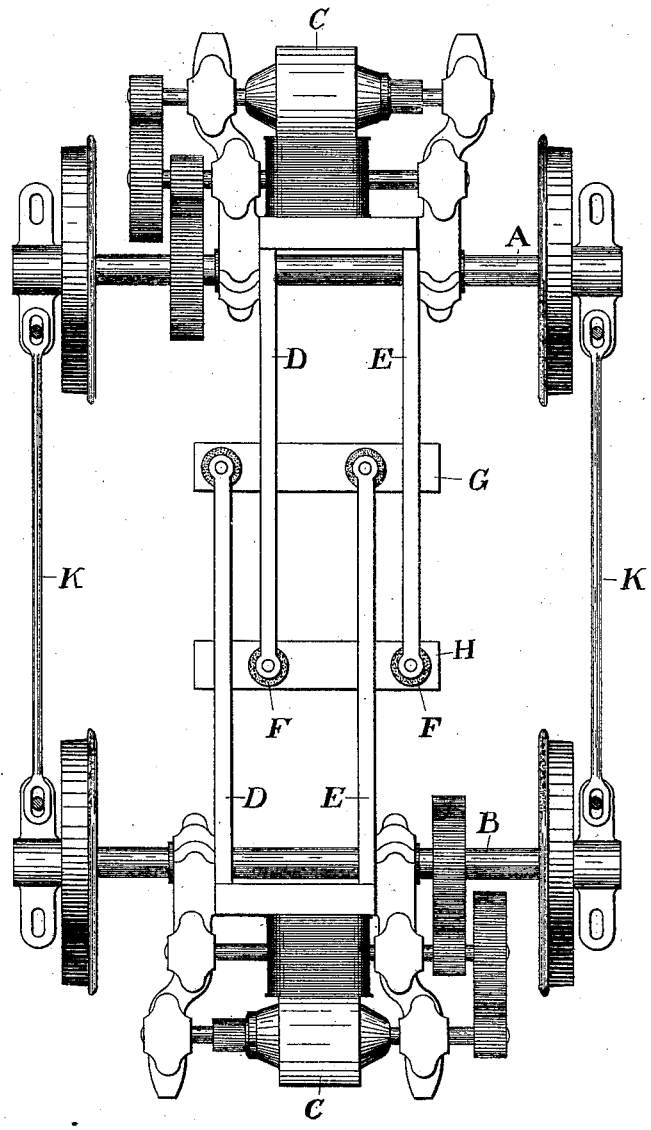
Witnesses.
R. L. Lovell.
A. O. Orne
Inventor.
Walter H. Knight
by Bentley & Knight
Attys

UNITED STATES PATENT OFFICE.

WALTER H. KNIGHT, OF BOSTON, MASSACHUSETTS.

ELECTRIC-RAILWAY TRUCK.

SPECIFICATION forming part of Letters Patent No. 451,491, dated May 5, 1891.

Application filed February 15, 1890. Serial No. 340,514. (No model.)

*To all whom it may concern:*

Be it known that I, WALTER H. KNIGHT, a citizen of the United States, residing at Boston, Massachusetts, have invented certain new and useful Improvements in Electric-Railway Trucks, of which the following is a specification.

My invention consists in providing each of the two axles of an electric-railway truck with a propelling-motor, the two motors having extensions therefrom projecting inwardly and flexibly connected together, so that the two axles have freedom of radial adjustment for facilitating the action of the truck upon a curved track.

My invention is illustrated in the accompanying drawing, in which is shown a plan of a truck embodying my invention.

In the drawing, A and B are respectively two axles of a truck, and each of these two axles is provided with a propelling-motor C. From each of the two motors I provide an extension consisting of two bars D and E. Each of these bars is provided at its inner end with a rubber spring F, and they are provided with two cross-bars G and H. The two sets of projections overlap each other, and passing one of the cross-pieces so as to move freely thereon, they are firmly attached to the succeeding one with the intermediate cushion provided by the rubber F. Outside of the wheels are the ordinary journal-boxes for carrying the car-body. Upon opposite sides of the truck I connect the two boxes by tie-rods K, which are so connected to the journal-box as to permit of a longitudinal movement sufficient to accommodate the axles to the natural tendency to swivel on a curve, assuming a position more or less coincident with the radius of the curve. A truck thus constructed will pass around the curve much more easily than when a rigid connection is employed.

What I claim as new, and desire to secure by Letters Patent, is—

1. The combination, with two axles of an electric-railway truck, of a propelling-motor upon each axle and inward extensions flexibly united at their inner ends to permit freedom of radial adjustment of the axles.

2. The combination, with opposite axles of an electric-railway truck, of a propelling-motor for each axle and a framing upholding the motor and provided with an extension flexibly united to a similar extension from the opposite axle, whereby radial adjustment of the axles is permitted.

3. The combination, with the opposite axles of an electric-railway truck, of a propelling-motor for each axle, the two axles being flexibly connected to permit their radial adjustment upon curves.

4. The combination, with the opposite axles of an electric-railway truck, of a propelling-motor for each axle and a framing for each motor, by which it is supported, and which is journaled on the axle and provided with an inward extension flexibly connected to a corresponding extension from the other axle.

WALTER H. KNIGHT.

Witnesses:
  C. L. HAYNES,
  G. R. BLODGETT.